No. 1,397. REISSUED FEB. 3, 1863.

J. G. TREADWELL & W. HAILES.

STOVE.

3 SHEETS—SHEET 1.

WITNESSES:
Gustav Dieterich
Edm. F. Brown

INVENTORS:
John G. Treadwell
Wm. Hailes
by His Attys
Mason Fenwick & Lawrence

THE NORRIS PETERS CO. PHOTO-LITHO. WASHINGTON, D. C.

No. 1,397. REISSUED FEB. 3, 1863.

J. G. TREADWELL & W. HAILES.

STOVE.

3 SHEETS—SHEET 2.

WITNESSES:
Gustave Datrich
Edm F. Brown

INVENTORS:
John G. Treadwell
Wm Hailes
by their Attys
Mason Fenwick & Lawrence

THE NORRIS PETERS CO., PHOTO-LITHO., WASHINGTON, D. C.

No. 1,397. REISSUED FEB. 3, 1863.
J. G. TREADWELL & W. HAILES.
STOVE.
3 SHEETS—SHEET 3.
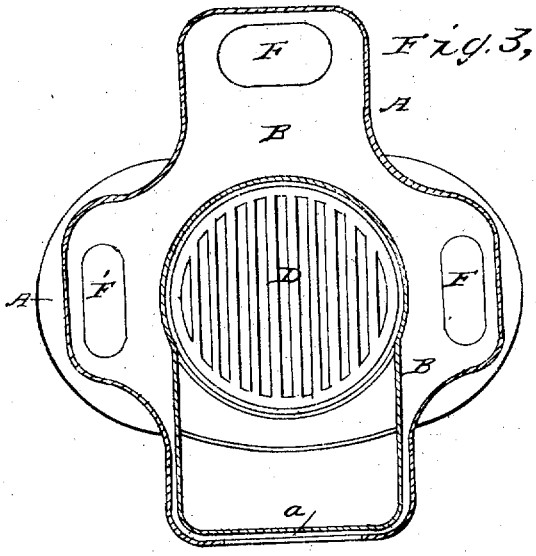
Fig. 3,
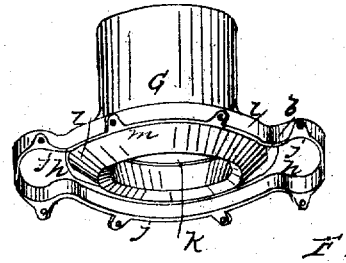
Fig. 4,
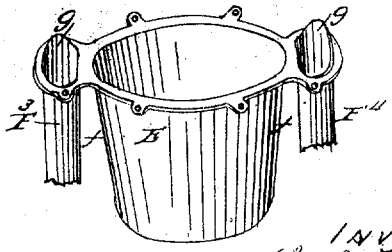
WITNESSES:
Gustave Dieterich
Edm. H. Brown
INVENTORS:
John G. Treadwell
Wm Hailes
by their Atty
Marion Fowler & Hamm
THE NORRIS PETERS CO., PHOTO-LITHO., WASHINGTON, D.C.

UNITED STATES PATENT OFFICE.

JOHN G. TREADWELL AND WM. HAILES, OF ALBANY, NEW YORK, ASSIGNORS TO WILLIAM HAILES AND ELLEN T. TREADWELL.

IMPROVEMENT IN STOVES.

Specification forming part of Letters Patent No. 32,257, dated May 7, 1861; Reissue No. 1,397, dated February 3, 1863.

*To all whom it may concern:*

Be it known that we, JOHN G. TREADWELL and WILLIAM HAILES, of Albany, in the State of New York, are the inventors of certain new and useful Improvements in Base-Burning Stoves or Furnaces, of which the following is a full, clear, and exact description, reference being had to the accompanying drawings, forming part of this specification, in which—

Figure 1:
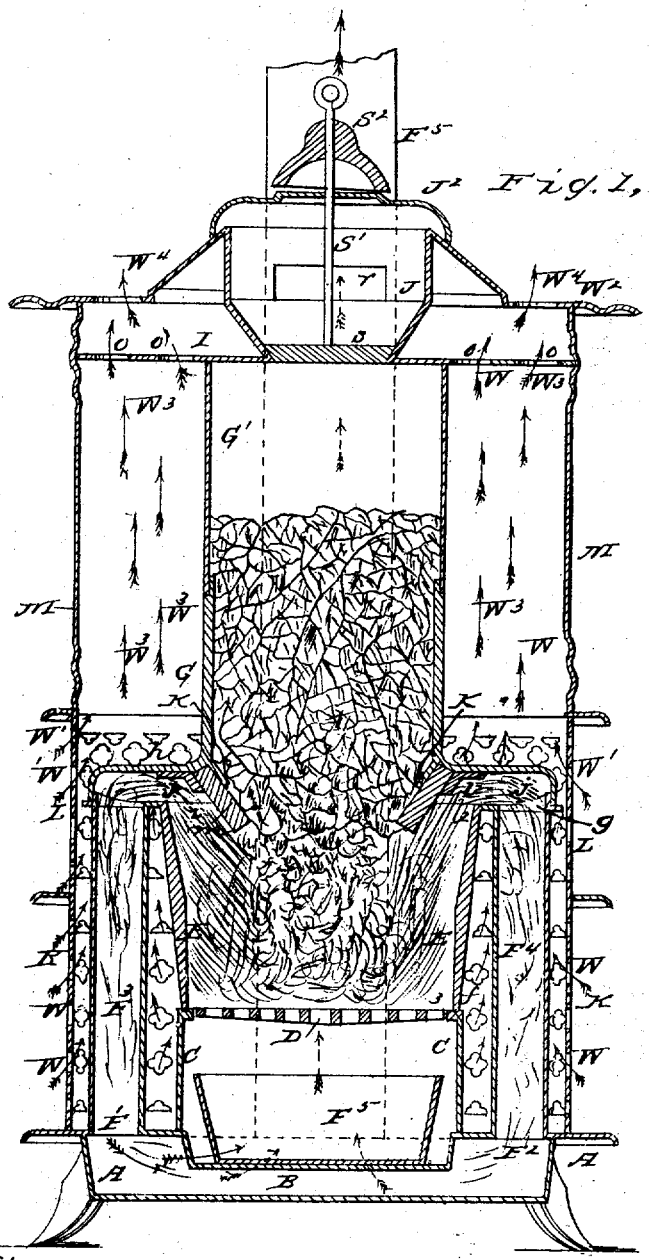
Figure 2:
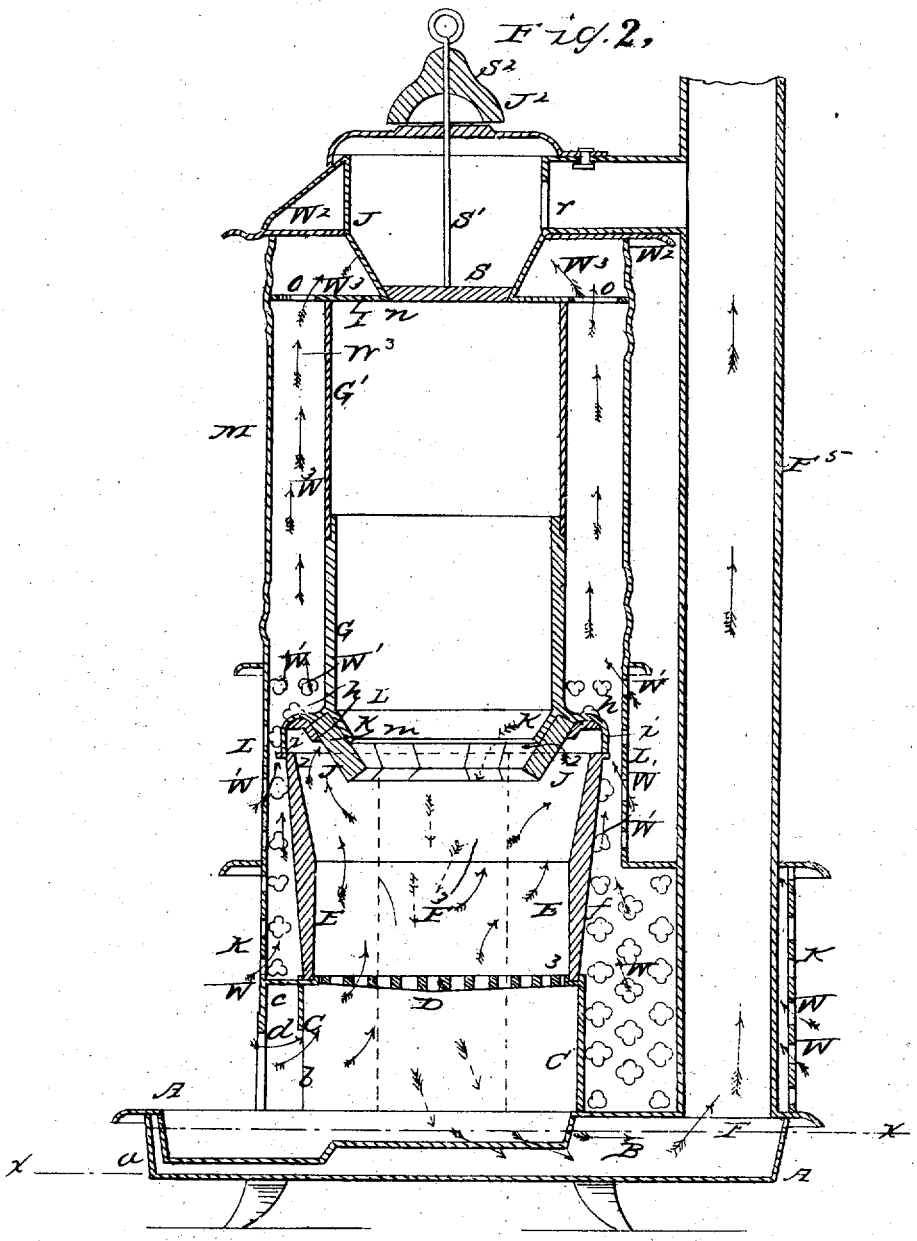

Figure 1 is a vertical section in a line at right angles to the smoke and draft flue. Fig. 2 is a similar section directly through the smoke and draft flue. Fig. 3 is an inverted horizontal section through the base part of the stove in the line *x x* of Fig. 2. Fig. 4 is a perspective view of the fire-pot and of the under side of lower portion of the coal-reservoir as the same appear when separated from each other.

The same letters of reference in the several figures indicate corresponding parts.

The subject of base-burning or reservoir stoves and heaters has long engaged the attention of the public, and the success of this class of stoves is no longer a question of doubt and the value thereof is an every-day experience of hundreds in different parts of the country, and the only question that now remains to be solved is, which is the best or most economical and beneficial mode of embodying the principle involved in such stoves and heaters. Our experience in this class of stoves is, that the most beneficial effects are to be secured from an organization which does not pass the products of combustion up, around, and over the top of the coal-supply reservoir so as to heat a surrounding jacket thereof, but heats a circulating or ascending body of air by means of radiated heat from the fire-pot, and at the same time heats the base of the stove by means of direct heat circulating through descending flues which lead into the ash-pit or around it and to the smoke and draft flue; also that the greatest economy, considering the increased benefits secured, from supplying coal continuously out of a reservoir is attained with an arrangement which holds the superincumbent body of coal in suspension—such arrangement being a reservoir with a contracted discharge extending slightly down into a flaring or enlarged fire-pot, around or above the whole upper edge of which outside of the contracted discharge of the coal-supply reservoir the flame is allowed to circulate, and therefrom caused to descend and circulate around or under the base portion of the stove in its passage to the smoke and draft flue.

The effect of the first-named plan is to husband the radiated heat and use it for the purpose of warming the upper part of the stove and the room in which it is situated, as well as for heating air for warming rooms above, if desirable, and at the same time to so confine the direct fire heat and keep it in contact with the base portion of the stove a sufficient length of time as to insure the warming of the same to a comfortable degree.

The effect of the second plan is to relieve the incandescent coal from the weight of the body of superincumbent coal, and thus obviate a compression of the incandescent coal in the fire-pot and secure for the flame a free expansion in a lively and brilliant manner, and thus enable it to act with great heating effect upon the lower portion of the stove in its passage to the smoke and draft flue.

With the view of organizing a stove or heater which operates on the base-burning or coal-supply-reservoir principle, and at the same time embraces the two plans of operation above referred to, we have devised the following plan of construction:

A is the base of our stove, constructed with a chamber, B, which extends around and beneath the top plate of the said base. In this chamber air may be admitted through the front passage, *a*. Upon the top plate of the base A is erected a support, C, for a horizontal grate, D, and a fire pot, E, as shown. The support forms a chamber below the grate, and out of the front of the support a portion of metal is removed, as at *b*, so that air to the fire on the grate may have free access when the ordinary regulator or damper is open.

In order to insure the passage of the air to the fire only from below the grate, a cut-off, *c*, extends out from the upper front part of the support C, and rests upon two lateral stops, *d*, which extend out from the front of the support, as shown. The top plate of the base, at points outside of the support, C is perforated with three apertures, F F′ F², which communicate with the chamber B. The apertures F′ F² have vertical pipes F³ F⁴ placed in or around them, while the aperture F has the draft and smoke pipe or flue F⁵ placed in or around it, as shown. The pipes F³ F⁴ extend up to the upper rim of the fire-pot E, and connect to perforated flanges or ears of said pot, so that a space, *f*, exists between the pipes and fire-pot, as shown. The outer portion of top edge of the pipes F³ F⁴ protrudes above the flanges to a slight degree, as indicated at *g g*.

The fire-pot flares at top and contracts at its bottom. The flare and contraction are gradual. The section of the metal of which the pot is made shows a gradual decrease in thickness from the center of the depth of the pot in an up and downward direction, as indicated at 1 2 3. This construction or form of the metal insures an equable heating of the pot at all parts and a uniform expansion and contraction by the principle of conduction—the thickest and most intensely-heated portion imparting to the thinnest or less intensely-heated portions a large amount of its heat on the principle just mentioned.

Above the fire-pot and vertical pipes the coal-supply reservoir G is arranged. This reservoir is constructed with a flange, *h*, at its base, said flange turning down at its outer edge so as to form a right angle or thereabouts, as shown at *i*. The rim *i* of the flange fits down upon the rim of the fire-pot, and incloses the top opening of the fire-pot and of the vertical pipes within a continuous chamber, *j*, as represented, the said chamber constituting an enlargement to the upper portion of the fire-pot, as it were, and thus giving increased room for the expansion of the flame.

The diameter of the coal-reservoir is decreased below the point where the body of supply coal is suspended by means of an extension or ring flange, *k*, which is in form of an inverted frustum of a cone. This flange also serves, in connection with a detachable ring, *l*, which also is in form of an inverted frustum of a cone, to form a frame or sash for the reception of fire-brick or other fire proof material, as shown at *m*. The ring *l* has a horizontal flange, and bolts by the same to the under side of the flange *h* of the coal-supply reservoir. The fire-brick are shaped so as to form, when put together, an inverted frustum of a cone, and they therefore, when clamped between the devices *k l*, cannot descend separately out of their places, nor can they do so unitedly, as the largest circumference of the conic frustum *m* cannot pass through the space between the lower ends of the devices *k l*. It will be observed that the fire-brick continues the contraction of the coal-supply reservoir, and thus insures a gradual descent of the supply coal upon the central part of the bed of incandescent coal, and at the same time leaves a large and open space outside of the conic frustum *m* for the free burning and expanding of the gases or flame. This result is also furthered by the dishing form of the flange *h*, the same forming a large circulating flame-channel, *j*, all around the upper edge of the fire-pot, as illustrated.

The reservoir G is continued up to a horizontal division-plate, I, of the stove by means of an extension, G′, as shown. The division-plate I has a large coal-induction hole and passes through the removable cover-plate J² of the hopper, and also through a weight, *s*², as shown. The weight *s*² is not level on its bottom with the top surface of the cover-plate J², nor is the quantity of metal on one side of the rod as great as that on the other side. The cover-plate, the valve, the rod, and the weight are all connected together, so that by taking hold of the rod the whole can be lifted together—that is, when the valve is raised first to its full stroke—but the connection is also such that when the valve is required to be raised a less distance than its full stroke, the movement of the valve is independent of the cover-plate J², therefore the branch flue *r* can be opened and closed or the damper-valve *n* adjusted in its center, and several hot-air passages *o o*, near its circumference or outside of the circle of the coal-supply reservoir, as shown. Around the central hole, *n*, there is constructed a small combined cylindric and conic hopper, J, which is furnished with an adjustable valve, *s*, and a removable cover-plate, J², as hereinafter described. Through and from the rear of this hopper there extends a branch draft-flue, *r*, the same leading into the main draft-flue E⁵, as shown. In order to open and close this flue *r*, and also to open and close the induction-hole to the coal-supply reservoir, the taper valve *s* is fitted to the lower part of the hopper J, and up from the center of the back of this valve a vertical rod, *s*′, extends without disturbing the cover-plate, and whenever such an adjustment of the valve is made, the weight, by reason of its being unbalanced, will automatically bind upon the rod and hold it and the valve in suspension.

It is desirable to open the branch of the direct draft-flue when the fire is first started, and also before the cover-plate J² is removed, first, in order to obtain a powerful draft, and, second, to pass off the pent-up gases in the coal-reservoir through the branch flue, instead of allowing them to puff out into the room at the time when fresh coal is being introduced.

The organization thus far described has but one shell, and in order to make it a double shell or wall stove a casing, K L M, is placed around it from base to top. The part K of this casing incloses a portion of the fire-pot and of the vertical pipes and draft-flue. This part is finely perforated all round so as to admit air to the first wall to be heated, as indicated at *w*. The part L of the casing incloses the remainder of the vertical pipes and fire-pot, and also a small portion of the coal-supply reservoir, but not the main draft or smoke flue. It is also finely perforated, so as to admit cold air, as indicated at $w'$. The part M of the casing incloses the remainder of the coal-supply reservoir, and extends up to and unites with a stationary top or finishing plate, $W^2$. This part of the casing is not perforated, but the plate $W^2$ has perforations through it for the escape of the confined heated air $w^3$ into the room or into pipes leading to rooms above, as indicated by arrows $w^4$.

It will be seen that the air circulates all about the radiating-surface, and thus protects the same from rapid destruction by the fire, and while this is the case the air is very thoroughly heated, and discharged in that state into the room where the stove is situated or into other conductors.

We have given a minute description of one practical mode of embodying our invention, but in doing so we have not intended that we should be understood as confining ourselves to the details mentioned, as it is obvious that the invention may be embodied in various ways. For instance one or more than two vertical pipes like $F^3$, might be adopted.

Again, the contraction of the discharge end of the coal-supply reservoir below the superincumbent body of coal may be effected in various ways and still not depart from the principle involved in holding the mass of coal in a chamber or section of a chamber which is of greater diameter than the section or part through which the coal is fed to the fire. For instance, a cylindric discharge of a given diameter connected with an upper extension of greater or gradually-increasing diameter above the discharge would embody the principle involved in our reservoir. So, also, would two cylinders—one of a small diameter and the other of a large diameter—united by an inclined or horizontal shoulder.

It will be observed that we have a base-burning stove with a coal-supply reservoir and a hot-air chamber, which is adapted for heating the room in which it is situated or the same and rooms above, and still the organization has but two walls or shells, and that, in connection with this, we have an arrangement which effectually heats the lower portion of the stove or structure, and also very perfectly controls the feed of the coal to the fire.

What is claimed as new herein, and as the invention of JOHN G. TREADWELL and WILLIAM HAILES, is—

1. A base-burning coal-supply reservoir stove or furnace, so constructed that the products of combustion do not pass up, around, and above the supply reservoir nor up through the grate, but down outside of the fire-pot toward the base of the stove and out through a main draft-flue which leads directly from a space or chamber about the lower part of the stove, all for the purpose set forth, and substantially as described.

2. The contracting of the discharge-end of the coal-supply reservoir, the expanding of the fire-pot, and the extending of the flame-passage downward for united operation in a base-burning coal-supply reservoir stove or furnace, essentially as set forth.

3. A fire-pot resting on a base and imperforated on its inner or outer circumference or from its inner to its outer circumference, and so constructed and applied with respect to a coal-supply reservoir that an inclosed horizontal chamber for the free expansion and circulation of the flame and gases is formed all around and outside of the contracted discharge and above the upper edge of the fire-pot, substantially as and for the purpose set forth.

4. The descending passage or passages, in combination with the continuous flame expansion and circulation passage and a main draft-flue leading out of the base or lower part of the stove or furnace, substantially as set forth, and for the purpose described.

5. Constructing the fire-pot of a base-burning coal-supply reservoir stove or furnace with an imperforated circumference and in form of a trumpet-mouth at its upper portion, in combination with descending flame-passages, substantially as described, and for the purpose set forth.

6. Constructiong the metal of the fire-pot with a gradually-decreasing thickness from the center of its depth both up and downward, substantially as described.

7. A detachable ring, in combination with a fixed ring-flange of a coal-supply reservoir, for the purpose of confining the fire-brick or other fire-proof substance on the lower part of the reservoir.

8. The combination of a perforated jacket or casing, a coal-supply reservoir with a contracted discharge, a fire-pot with a flame-expansion chamber around and above its upper edge, and a descending flue or flues and a main draft-flue, substantially as and for the purpose described.

9. The combination, in a base-burning coal-supply reservoir-stove, of a descending flue or flues and a perforated casing, substantially as and for the purpose set forth.

10. In a base-burning, coal-supply reservoir-stove or furnace, a branch flue opened and closed by a damper above the base of the fire-pot, in combination with a descending passage or passages leading to the lower part of the stove, and with the main draft-flue leading out of the lower part of the stove, substantially as and for the purposes set forth.

11. The weight constructed and applied in connection with the damper-valve in the manner and for the purpose set forth.

12. The combination of the perforated jacket or case, the reservoir for coal, the fire-pot, the descending flue or flues, the hollow space about the base of the stove, and the chimney-flue, whereby the base of the stove is heated by direct heat of the flame or gases and the upper part of the stove by radiated heat acting upon the circulating air, substantially as described.

JNO. G. TREADWELL.
WILLIAM HAILES.

Witnesses:
W. W. CRANNELL,
C. VAN ALLEN.